Dec. 18, 1962 L. A. DICK ETAL 3,069,572

PIEZOELECTRIC DEVICE

Filed Dec. 2, 1958 3 Sheets-Sheet 1

INVENTORS.
Louis A. Dick
Lloyd G. Martyn
BY
Carlson, Pitzner, Hubbard & Wolfe
Attys.

INVENTORS.
Louis A. Dick
Lloyd G. Martyn
BY
Carlson, Pitzner, Hubbard & Wolfe
Attys.

Dec. 18, 1962 L. A. DICK ETAL 3,069,572

PIEZOELECTRIC DEVICE

Filed Dec. 2, 1958 3 Sheets-Sheet 3

INVENTORS.
Louis A. Dick
Lloyd G. Martyn
By
Carlson, Pitzner, Hubbard & Wolfe
Attys.

United States Patent Office 3,069,572

Patented Dec. 18, 1962

3,069,572

PIEZOELECTRIC DEVICE

Louis A. Dick, Park Ridge, and Lloyd G. Martyn, Sandwich, Ill., assignors, by mesne assignments, to The James Knights Company, Sandwich, Ill., a corporation of Delaware Filed Dec. 2, 1958, Ser. No. 777,786
12 Claims. (Cl. 310—8.2)

This invention relates in general to piezoelectric devices and in particular to improvements in such devices which employ piezoelectric crystals adapted to vibrate predominantly in the thickness shear mode.

It is well known that piezoelectric crystals exhibit a marked resonance at certain frequencies when electrically excited, and that such crystals find widespread, important uses as frequency-determining elements in electronic oscillators, filters, and related equipment. With the increased modern use of such crystals in mobile equipment and military apparatus, the demand has been urgent for crystals which will be substantially immune from frequency changes despite severe mechanical shocks or jars. Coordinate with the demand has been the need for crystals which possess a quality factor or "Q" considerably higher than that which is afforded by crystals presently manufactured in large quantities.

The present invention has to do with crystals which vibrate predominantly in the thickness shear mode. Such crystals are widely used to produce fundamental frequencies in the range from about 800 kc. to about 30 mc. They are also used to obtain frequencies in the range from about 10 mc. to about 150 mc. when excited to mechanically produce harmonics. These thickness shear mode crystals, examples being the familiar AT and BT cuts, are the only ones which will operate in the above-indicated frequency ranges and yet have a substantially zero coefficient of frequency drift with temperature changes.

It is the general aim of the invention to provide a piezoelectric device employing a thickness shear mode crystal of substantially circular, wafer-like shape which produces the multiple advantages of (1) a high degree of mechanical stabilty in its supports, (2) increased immunity from transient or permanent frequency changes as a result of mechanical shocks and (3) possession of Q's considerably increased above those previously obtained in production crystals.

Correlated with that aim, another object of the invention is to bring forth such an improved piezoelectric device which involves little additional trouble and expense in its manufacture, as compared with prior devices which were less immune to shocks and which afforded lower Q's.

It is a further object of the invention to minimize the loading effect of members attached to and supporting a circularly shaped piezoelectric crystal which is cut to vibrate predominantly in the thickness shear mode.

Still another object is to reduce the effects, both transient and permanent, on the operating frequency of such a crystal which may be induced by forces transmitted to the crystal from its mounting connections.

Other objects and advantages will become apparent as the following description proceeds, taken in conjunction with the accompanying drawings, in which.

While the invention has been shown and is described in some detail with reference to particular embodiments thereof, there is no intention that it thus be limited to such detail. On the contrary, it is intended here to cover all modifications, alternative constructions and equivalents falling within the spirit and scope of the invention as defined by the appended claims.

Figure 1:
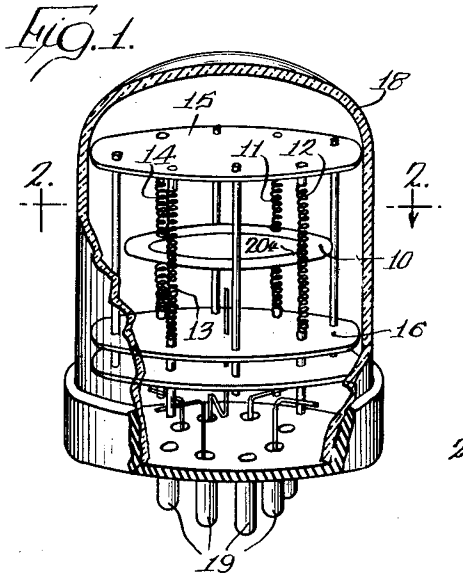
FIGURE 1 is a perspective view of a piezoelectric device embodying the features of the invention.

Referring now to the drawings, the exemplary piezoelectric device illustrated in FIG. 1 includes a wafer-like piezoelectric crystal 10 cut from quartz or other similar material. The crystal is physically supported by engagement at its edges with four mounting members 11–14 which are, in turn, held between spaced insulating disks 15 and 16. This assembly of the crystal 10 and its supporting means is enclosed within an evacuated envelope 18, the latter having connector pins 19 extending through its base. As is well known, evacuation of the interior of the envelope reduces the atmospheric resistance to dimensional changes of the crystal 10 as the latter vibrates, and results in an increased Q.

For establishing an electric field across the crystal 10, the latter is provided with electrically conductive coatings 20 and 21 on its opposite faces. Those coatings are applied by a metal vapor condensation process or the like, so as to be very thin. The coatings are applied only to the central portions of the opposite crystal faces, and do not extend completely to the peripheral edge. For applying a voltage between the two coatings 20, 21, each includes a "flag" or portion 20*a*, 21*a* which extends to the periphery of the crystal to be electrically contacted respectively by the conductive support members 11 and 13. As shown in FIG. 1, the support members 11 and 13 are connected by wires to two of the connecting pins 19. The application of a voltage between the pins 19 thus creates a corresponding voltage between the coatings 20 and 21, establishing an electric field transversely through the crystal 10.

Figure 2:
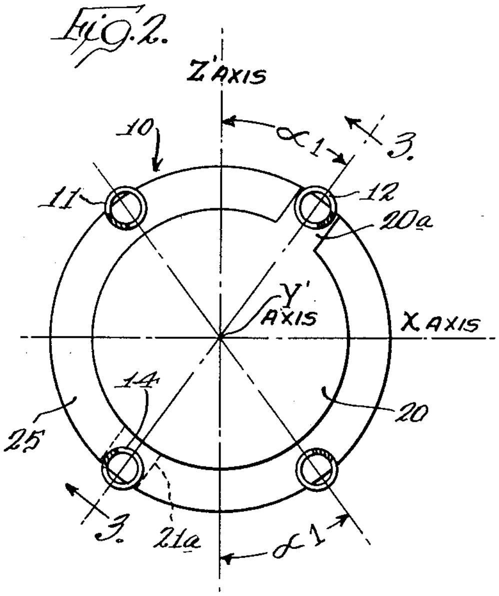
FIG. 2 is an enlarged horizontal section taken substantially along the line 2—2 in FIG. 1.
Figure 3:
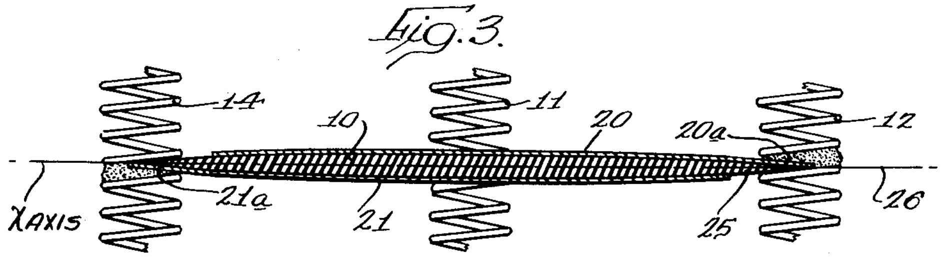
FIG. 3 is a cross-sectional view of the crystal itself, taken substantially along the line 3—3 in FIG. 2.

The crystal 10 here shown in FIGS. 1–3 is a thickness shear mode crystal which has its X and Z' axes extending diametrically thereacross and disposed mutually at right angles (FIG. 2). The Y' axis of the crystal is disposed transversely to the crystal body. As a varying electric field is applied through the crystal parallel to the Y' axis, i.e., across the thickness of the crystal, the upper and lower portions of the crystal tend to move in opposite directions along the X axis, creating a thickness shearing action illustrated in idealized form by the dotted line configuration of the crystal 23 shown in FIG. 4.

It will be observed also from FIG. 3 that the opposite faces of the crystal 10 need not be perfectly flat, but on the contrary, may be ground to have a slight spherical curvature. And, as shown in FIG. 2, the crystal, while very thin, is substantially circular in shape. This circular shape for thickness shear mode crystals is almost exclusively employed in the art because it greatly facilitates the production of crystals which are ground accurately to fine dimension tolerances. Moreover, it enables lapping of the slight spherical surfaces on the opposite crystal faces in a more convenient and less expensive manner.

It has been known that advantages accrue from engaging mounting and electrical connecting means substantially at the nodal shear plane of a crystal, as disclosed and claimed in Sylvester et al. Patent No. 2,443,700. That patent also indicates that mounting and connecting means should, moreover, engage the crystal at a nodal line of longitudinal flexural oscillation and a nodal line of transverse flexural oscillation. This can be readily achieved in mounting rectangular crystal plates. When circular crystal plates are used, however, there are no identifiable longitudinal and transverse oscillations and separate nodal lines of longitudinal and transverse oscillation do not exist.

Figure 4:
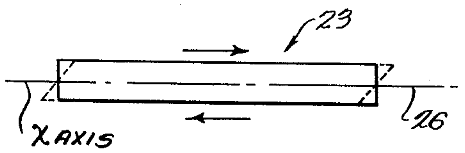
FIG. 4 is a diagrammatic illustration of the dimensional changes which occur in a crystal vibrating in a pure thickness shear mode.

As illustrated in FIG. 4, a plane 26 lying through the middle of the thickness shear mode crystal is substantially undistorted by dimensional changes as a result of shearing action, and engagement of mounting and connecting means at this nodal shear plane reduces the loading effect created by such mounting means. In keeping with known practice taught by the Sylvester et al. patent the peripheral edge portion of the crystal 10 is beveled as at 25 (FIG. 3), thereby substantially exposing the nodal shear plane. The mounting means 11–14 clip on or otherwise engage the crystal 10 at its edge and thus substantially on the nodal plane 26 which passes through the apex of such beveled edge.

In prior piezoelectric devices utilizing circular, thickness shear mode crystals, the angular locations about the periphery of the crystal body which the mounting and connecting means engage have been deemed unimportant. Such locations were in the past randomly chosen, the flags from conductive coatings being brought out to the crystal periphery at any angular point thereon. Generally, these flags were brought out along the Z' axis of the crystal, and the mounting means engaged with points lying along that axis. If only two mounting means were employed at the ends of the Z' axis, the support of the crystal did not have the desired degree of mechanical strength and stability. And if a third or fourth mounting element were engaged with the crystal the latter exhibited a lower Q than is desirable in many applications.

Our invention is predicated on the discovery that significant performance advantages can be realized by locating the mounting and connecting means such that they engage the crystal at certain predetermined peripheral points which lie between the X and Z' axes, and which are spaced by critical angles from those axes. As will be explained below, the location of these attachment points at certain angular positions on the crystal periphery results in an increase in the Q afforded by a given crystal and in greater immunity from frequency deviation as a result of mechanical shock.

The crystal 10 here illustrated in FIGS. 1–3 is, by way of example, an AT cut crystal intended for operation at room temperature (about 20° C.). But beyond the attachment of the mounting means at points lying substantially on the nodal shear plane 26, and in accordance with our invention, four mounting means are provided. They are themselves supported in parallel, angularly spaced relation such that they can engage the peripheral edge 25 of the crystal 10 at points which lie displaced by predetermined angles $\alpha_1$ from the Z' axis of the crystal. This angle $\alpha_1$ may not under all circumstances have exactly the same value, but for the AT cut crystal illustrated in FIGS. 1–3, it is given a value of about 35° or 40°, and is here illustrated as 37°.

Figure 5:
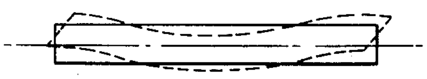
FIG. 5 is similar to FIG. 4, illustrating the dimensional changes in a crystal vibrating in the thickness shear mode and having coupled flexure motion (illustrated to an exaggerated degree)

As indicated above with reference to FIG. 4, a thickness shear mode crystal vibrates predominantly as a result of a shearing action along the X axis and which may be visualized as the tendency of the upper portion of the crystal to move in one direction and the lower portion of the crystal to move in the opposite direction about the nodal shear plane. However, it has been our hypothesis that any circular crystal which vibrates almost totally in the shear mode will have some slight spurious motions such as an almost undetectable coupled flexure action. As illustrated to an exaggerated degree in FIG. 5, if a thickness shear mode crystal of the type in FIG. 4 is vibrating predominantly in the shear mode, that crystal will, nevertheless, have some undulatory distortion or flexure action. Such spurious rippling or flexure of a circularly shaped crystal is neither a longitudinal nor a transverse flexure but a complex combination of the two. Any limitation or restraint even on this spurious motion of the circular crystal body will necessarily load the crystal, i.e., result in a dissipation of energy. That reduces the Q which the crystal exhibits. This has been overlooked in the art up to the present time, and presents a problem which the present invention not only recognizes but solves.

We have found that in the case of the crystal illustrated by FIGS. 1–3, when the mounting and connecting means 11–14 are engaged at the peripheral edge portion of the crystal at points disposed from the Z' axis of the angle $\alpha_1$, those points fall on nodes of any slight spurious motion which may exist. Accordingly, the crystal is not flexing to an appreciable extent at the points where the mounting means engage it. Thus, the mounting means do not load or restrain the vibration of the crystal and leave it free to vibrate with a significantly increased Q. By way of example, we have found that with substantially identical crystals mounted in similar envelopes evacuated to the same degree, the operating Q can be increased from a value on the order of 100,000 (when four support means engage the crystal with two on the Z' axis and two at randomly chosen points) to values on the order of 2 to 5 million (when four support means engage the crystal at points displaced from the Z' axis by about 37°). By this relatively simple expedient of locating the angular positions of mounting attachment points, the Q is significantly increased toward the theoretically optimum value of about 18 million while achieving the same degree of mechanical stability.

Figures 6, 7:
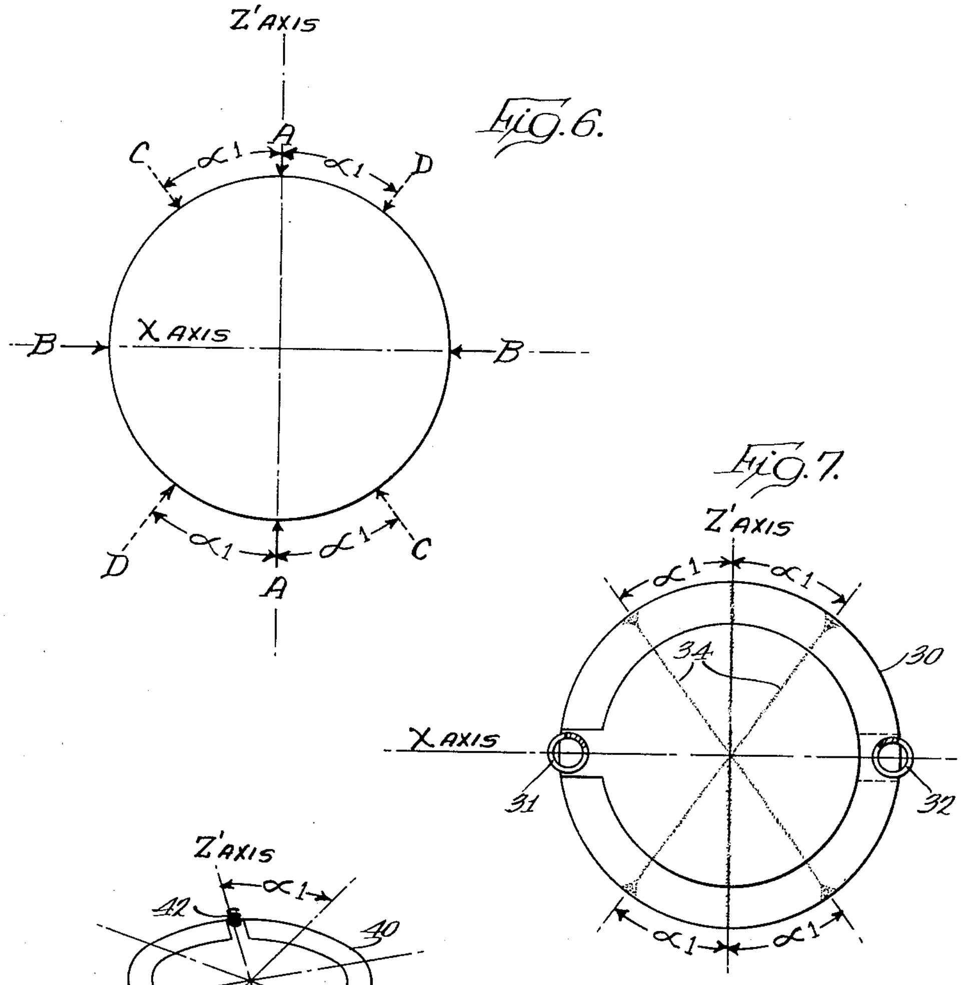
FIG. 6 is a diagrammatic plan view of a thickness shear mode crystal showing the peripheral locations of forces which have certain effects on the frequency of vibration.
FIG. 7 is a diagrammatic illustration of the manner in which peripheral locations of mounting means for optimum performance are located on a circular crystal.

We have recognized also, that when forces or stresses are applied to a circular, thickness shear mode crystal, a change in the operating frequency occurs. For example, if compressive forces A, A are applied to the edges of a crystal along the Z' axis as shown in FIG. 6, the operating frequency of the crystal will be instantaneously increased, and by an amount proportional to the magnitude of the forces. On the other hand, if compressive forces B, B are applied diametrically across the crystal along the X axis (FIG. 6) the operating frequency of the crystal will be instantaneously decreased. If the forces A, A and B, B are in the opposite sense, i.e., tensioning forces, the changes in the crystal's frequency of operation will be of the opposite sense. We have found that if diametric forces are applied to the crystal in certain directions which are angularly displaced from the Z′ axis of predetermined angles $\alpha_1$, those forces will have less effect on the operating frequency of the crystal as compared to forces along the Z′ or X axes. As shown in FIG. 6, forces C, C and D, D which are applied to the edge of the crystal along diameters displaced by the angle $\alpha_1$ from the Z′ axis will have relatively little effect on the instantaneous operating frequency of the crystal.

A part of our discovery has been that the angle $\alpha_1$ (FIG. 2) for the location of four mounting points, so as to realize both high mechanical stability and an increased Q, also produces a crystal assembly which exhibits relatively slight frequency deviations as a result of stresses transferred through the crystal support members.

When the crystal assembly of FIG. 1 is subjected to abrupt accelerations or physical shocks, for example, if it is utilized in aircraft or motor vehicles, there will be a transfer of forces from the mounting members to the edge of the crystal. However, owing to the fact that such forces are transferred through mounting members disposed at the angle $\alpha_1$ from the Z′ axis, they will cause only relatively small instantaneous deviations in the operating frequency of the crystal. By way of example, we have found experimentally that a crystal mounted by two members engaged at peripheral points lying on the Z′ axis may have a frequency deviation on the order of 10 to 20 parts per billion when subjected to a shock of 20 g's for about eight milliseconds. However, an identical crystal with four mounting means disposed at the particular angular locations herein described has been found to exhibit a frequency deviation in the order of 1 to 10 parts per billion when subjected to the same magnitude and duration of mechanical shock. Despite the greater number of mounting members in the latter case, and the greater frequency stability in the face of shocks, the latter crystal will provide a Q which is as high or higher than a crystal held on only two support members.

Still another advantage of the particular angular locations of the points at which the mounting means engage the periphery of a crystal lies in the fact that permanent deviation or "set" in the crystal frequency as a result of severe shocks is minimized. It is believed that when a crystal is subjected to an extremely severe mechanical shock, small cracks or fractures may be created immediately beneath the mounting means. Stress is at a maximum at such points, and the crystal is thinnest at its beveled edge. These cracks or fractures, of course, can change the physical properties of the crystal and result in a permanent deviation or "set" in its operating frequency. If, however, the mounting means are angularly spaced approximately 37° from the Z′ axis of the crystal, such cracks or other defects as might be created will lie at nodal points of any spurious motion which the crystal may have. Accordingly, the crystal is not dimensionally changing appreciably at the points where cracks or other defects appear, so that the defects do not have nearly as great an effect on the operating frequency of the crystal. And equally important is the fact that with three or four mounting members engaging the crystal at different points, the likelihood of stress concentration sufficiently high to produce such fractures is much less. Yet, with the supports disposed at the angles $\alpha_1$ (FIG. 2), their increased number does not load the crystal and lower its operating Q.

Our discussion as to the optimum angular locations at which mounting means are contacted with the peripheries of the crystal can be confirmed by analytical mathematics, and is also corroborated by laboratory tests. It is important to realize, however, that the specific value of 37° mentioned above for the angle $\alpha_1$ may not give optimum improvements in frequency stability and high Q for all thickness shear mode crystals cut in different planes, having different ratios of diameter-to-thickness, or operated at different temperatures. We have found, however, that the location of these optimum points of attachment can be readily and accurately ascertained. The best definition of the angle $\alpha_1$ is a designation as to how it is determined for any thickness shear mode crystal of a particular cut, diameter-to-thickness ratio, and operating temperature.

The angle $\alpha_1$ is determined in the following manner. The crystal blank is ground, lapped and etched to the dimensions necessary to establish the desired frequency of operation. Conductive coatings are then applied to the opposite faces of the crystal and flags brought out from those coatings to the edges of the crystal, preferably at points lying substantially on the X axis. This is illustrated for the crystal 30 in FIG. 7. Conductive mounting means 31 and 32 are then engaged with the edges of the crystal and in electrical contact with the respective coatings. The crystal is excited by the application of an alternating voltage to these conductive supports, and held at the design temperature of operation. While the crystal is in operation a small amount of ink or dust is applied to its upper surface. The ink or dust will distribute itself not only in a line lying along the Z′ axis but also in an X-shaped pattern as shown by the lines 34 in FIG. 7. The points at which these dust pattern lines terminate on the periphery of the crystal are the points at which mounting means should be attached to the crystal for the improved operation described above. After such peripheral points have been marked on their angular displacement $\alpha_1$ from the Z′ axis measured, the original coatings are removed from the faces of the crystal, and new coatings are applied with extensions or flags brought out to the periphery at two of the points previously located by the application of the ink pattern. The crystal is then mounted on four support means located at the four peripheral points shown in FIGS. 1–3 and will operate to provide higher Q and greater immunity to frequency deviations as a result of shock.

It should be understood that once the procedure described above in connection with FIG. 7 has been followed for one crystal of a given type cut, a given diameter-to-thickness ratio, and operating at a given temperature, a single determination of the angle $\alpha_1$ is sufficient. Accordingly, a great number of crystals of identical type, size, and operating temperature may be incorporated into the completed devices by attaching the mounting and supporting means at the angular points already established.

It should also be observed that in most prior devices utilizing circular, thickness shear mode crystals, the crystals have been supported by only two mounting means. This has been due to the fact that the use of more than two mounting means so loaded the crystal as to make its Q undesirably low. If three or more mounting means were employed in order to achieve good mechanical stability, then the Q was markedly reduced. Because the present invention recognizes that there are four points about the periphery of the crystal at which mounting means can be attached without sacrificing the Q or without creating appreciable frequency deviations due to shock, it is now entirely feasible to use three or four mounting means. This makes it considerably easier to assure that the crystal will not be bodily separated from its supporting means or seriously damaged as a result of exceedingly high mechanical shocks.

From the foregoing, it will be apparent that the forces which are exerted on a crystal can cause an instaneous change in the operating frequency. While such frequency deviations are small with the mounting means located as hereinbefore described, we prefer to make the mounting means resilient so as to cushion the crystal and reduce the forces transferred to it. With such reduction of forces for a given shock or acceleration, we further reduce frequency deviations.

As shown in FIG. 1, the particular mounting means 11–14 employed to support the crystal 10 are preferably, but not necessarily, made in the form of coil springs. Those coil springs are disposed in parallel, circularly spaced relation and are supported at their opposite ends by the respective insulating disks 15 and 16 (FIG. 1). These four coil springs possess a very high degree of resiliency and so cushion the crystal when the assembly is subjected to shocks that the resulting forces which are applied to the crystal itself by the springs are minimized. Such coil springs are relatively inexpensive, and it is especially convenient to attach the crystal to the springs, since the beveled edge portion of the crystal can simply be inserted between adjacent spring convolutions. A small amount of conductive cement or other suitable material may then be applied to those adjacent convolutions in order to positively lock them to the crystal. Finally, highly resilient coil springs can be made with convolutions of relatively small diameter so that the area of actual contact with the crystal is very small, further reducing the loading effect on the crystal.

Figure 8:
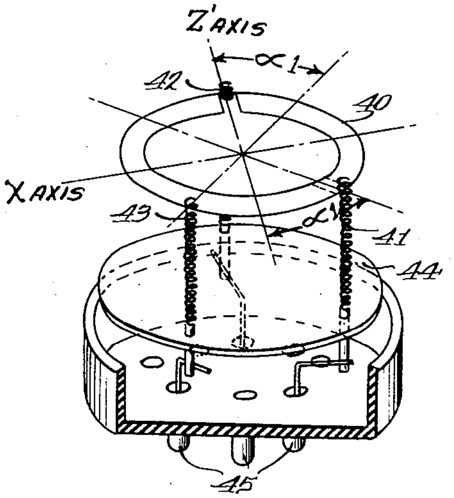
FIG. 8 is a schematic perspective of a modified piezoelectric device also embodying the features of the invention.

A second embodiment of the invention is illustrated in FIG. 8. As there shown, a crystal 40 is supported by three mounting springs 41–43, instead of four. When three such springs are employed, two are engaged at points angularly displaced by the predetermined angle $\alpha_1$ from the Z′ axis of the crystal in order to substantially realize the improved performance noted above. The third such mounting spring may be located at the periphery of the crystal substantially on the Z′ axis. The springs 41–42 are rigidly fixed at their lower ends to an insulating disk 44, while the adjacent convolutions near the upper free ends of those springs are clipped over the peripheral edge portion of the crystal 40 to support the latter. Radial extensions or flags extending from conductive coatings on the opposite faces of the crystal are brought out for engagement with two of the springs 41, 42 and the latter are electrically connected with pins 45 which extend through the base of the assembly for connection to electrical circuits.

The invention has thus far been described in connection with circular thickness shear mode crystals which vibrate in an almost, but not quite, pure thickness shear mode. The energy coupling which produces the spurious, undulatory or flexure action, noted above, is not highly pronounced, and the relatively simple X-shaped dust or ink pattern of FIG. 7 will be produced on an excited crystal. Under those circumstances, the angle $\alpha_1$, which designates the advantageous location of crystal supporting members, will have a value of approximately 35 to 40 degrees.

We have discovered, however, that as the diameter-to-thickness ratio of the crystals is changed, and especially as that ratio is decreased, even stronger coupling from the shear mode of vibration to the spurious flexing mode of vibration is established. Such increases in coupling to spurious vibration may also occur as the temperature of the crystal is changed. In certain crystals operating at certain temperatures, the optimum mounting points on the periphery of the crystal will not lie at 35 to 40 degrees from the Z′ axis. On the contrary, it has been observed that the nodal lines of spurious motion previously disposed at the angle $\alpha_1$ from the Z′ axis each split, in effect, into two nodal lines spaced from but centered about the original line. These two nodal lines terminate on the crystal periphery at angles of $\alpha_2$ and $\alpha_3$ from the Z′ axis, thus presenting a total of eight peripheral points in addition to two points on the Z′ axis, any combination of which may serve as the locations of engagement with crystal support members.

Figure 9:
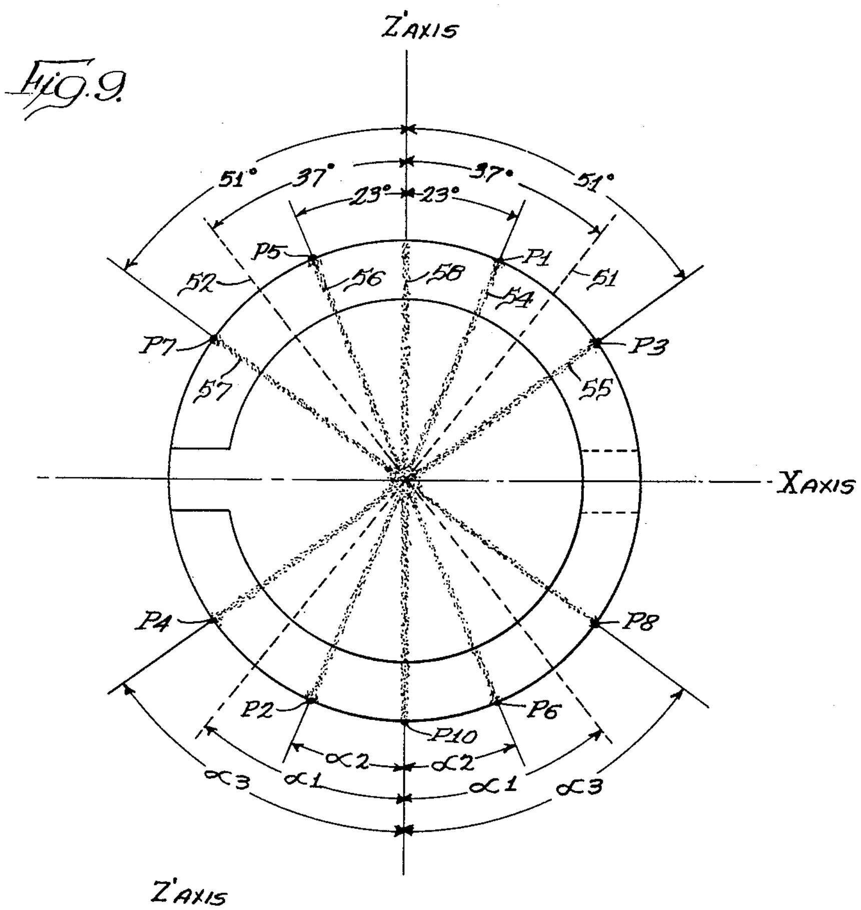
FIG. 9 is a diagrammatic illustration of a crystal excited to vibrate in a complex, spurious flexure mode, in addition to a thickness shear mode, and showing the manner in which peripheral mounting points for such crystal are located.

Referring to FIG. 9, a crystal 50 is there diagrammatically illustrated as being electrically excited by means not shown. For reference purposes dotted lines 51, 52 are added at angles $\alpha_1$ from the Z′ axis to indicate where nodal lines or dust patterns would fall if the crystal 50 had the same diameter-to-thickness ratio and the same operating temperature as the crystal 30 of FIG. 7.

In following the procedure described above in connection with FIG. 7, but on the crystal 50 of FIG. 9 which is assumed to have a smaller diameter-to-thickness ratio, it is found that ink or dust applied to the crystal distributes itself into a pattern of five diametric lines 54–59. The first two such pattern lines 54, 55 are displaced by equal angles on either side of the line 51, and these terminate on the periphery of the crystal at points P1, P2 and P3, P4. The line 54 and its end points P1, P2 are displaced by an angle $\alpha_2$ from the Z′ axis, while the line 55 and its end points P3, P4 are displaced from the Z′ axis by an angle $\alpha_3$.

In like manner the third and fourth pattern lines 56, 57 are displaced by equal angles on either side of the line 52, and these terminate at peripheral points P5, P6 and P7, P8. The line 56 and its end points P5, P6 are displaced by the angle $\alpha_2$ from the Z′ axis while the line 56 and its points P7, P8 are displaced by the angle $\alpha_3$.

The fifth dust pattern line 58 lies along the Z′ axis and terminates at points P9 and P10.

In realizing the advantages of the present invention, therefore, the crystal 50 may be supported by three or more support members (up to ten) which are engaged with any three or more of the ten peripheral points P1 through P10. At least one of the support members will be disposed either at the angles $\alpha_2$ or $\alpha_3$ from the Z′ axis. Engagement of support members at any of the points P1 through P8 displaced from the Z′ axis will not appreciably add to the loading of the crystal because such points have very little motion even though the crystal vibrates in a shear mode and a very complex spurious flexural mode. The Q of the crystal will thus be much higher than in the case where support members are engaged at peripheral points other than the points P1 through P8, and very good mechanical stability will be obtained.

It will be understood from the previous discussion relative to FIG. 7 that after the angles $\alpha_2$ and $\alpha_3$ have been determined by a dust or ink pattern on one crystal, then any number of crystals of the same diameter, thickness, and excited at the same frequency and subjected to the same temperature, may be mounted by supports engaged at peripheral points displaced from the Z′ axis by the same angles $\alpha_2$ and $\alpha_3$. There is no need to subject each and every crystal to a dust or ink pattern test.

The best definition of the angles $\alpha_2$ and $\alpha_3$ is the way in which they are initially found, i.e., by the dust or ink pattern technique applied to one of a number of identical crystals. By way of example, however, FIG. 9 indicates that the angles $\alpha_2$ and $\alpha_3$ for a typical crystal have been found to be 23° and 51°, respectively. To indicate generically the locations of support means on any crystal whether it has the weak spurious vibration illustrated in FIG. 7 or the stronger, more complex spurious vibration indicated in FIG. 9, it may be said that the support members are engaged with the periphery of a circular crystal at locations which are displaced by an angle $\alpha$ from the Z′ axis, such angle being that which separates the end points of any ink or dust pattern line observed during an initial test on a similar crystal.

Figure 10:
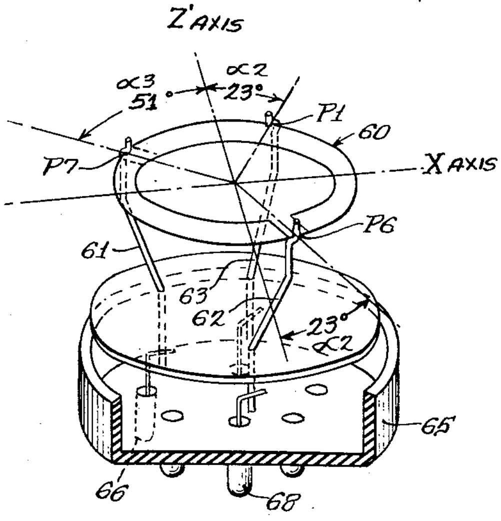
FIG. 10 is a schematic perspective view of still another embodiment of the invention utilizing a crystal which vibrates in the complex mode depicted by FIG. 9.

FIG. 10 illustrates one embodiment of the invention utilizing a crystal 60 of the type described in connection with FIG. 9. The crystal 60 is supported by three rods 61, 62 and 63 which extend upwardly from an envelope base 65. Each of the rods is crimped to define a notch therein which receives and holds the edge of the crystal, supporting the latter in substantially horizontal position. The rods 61 and 62 electrically contact flags or extensions of metal coatings disposed on the opposite faces of the crystal 60; and these two rods are connected by conductors to base pins 66 and 68 adapted for connection to an oscillator circuit or the like.

It will be noted that the three rods 61, 62, 63 are so disposed that they engage the crystal 60 at peripheral points P1, P6, and P7 which are respectively displaced from the Z′ axis by angles $\alpha_2$, $\alpha_2$ and $\alpha_3$, i.e., 23°, 23° and 51°. This is an arbitrary choice of three of the ten points P1 through P10 (FIG. 9). If desired, the three rods may be located to engage others of these ten peripheral points; or additional rods may be employed and engaged with additional ones of the ten points. Generally speaking the use of three or four support members will afford the requisite degree of mechanical stability, and one which is much higher than could be obtained by only two support members.

With the crystal 60 mounted as shown in FIG. 10, the advantages of high Q and good mechanical stability previously discussed will be realized, and even though the crystal 60 has a strong coupling to complex flexural vibration.

This application is a continuation-in-part of our earlier, copending application Serial No. 721,244, filed March 13, 1958, now abandoned.

We claim as our invention:

1. A piezoelectric device comprising, in combination, a substantially circular, relatively flat piezoelectric crystal cut to vibrate predominantly in the thickness shear mode and having diametric X and Z′ axes, at least three mounting means for supporting said crystal, said crystal and mounting means being relatively positioned such that at least two of said mounting means engage the periphery of the crystal at the end points of diametric lines displaced by angles $\alpha$ from the Z′ axis, said angles $\alpha$ being the angles between the Z′ axis and pattern lines formed by dust or the like applied to a similar excited crystal.

2. A piezoelectric device comprising, in combination, a substantially circular, relatively flat piezoelectric crystal cut to vibrate predominantly in the thickness shear mode, three mounting members supporting said crystal by engagement with the periphery thereof, said three mounting members being spaced and disposed so that the three peripheral points of engagement thereof with the crystal correspond to the locations of the ends of lines of a dust pattern formed on a test crystal of the same size and type as said first-named crystal and excited under the same frequency and temperature conditions specified for said first-named crystal.

3. A piezoelectric device comprising, in combination, a circular, relatively flat piezoelectric crystal cut to vibrate predominantly in the thickness shear mode, said crystal having conductive coatings on its opposite faces, at least three supporting means engaged with the edge of the crystal and angularly spaced about its periphery, at least two of said supporting means being angularly displaced from the Z′ axis of the crystal by angles $\alpha$ which correspond to the angles separating the Z′ axis and the lines of a dust pattern formed on a similar crystal when the latter is excited, and means electrically connecting two of said supporting means with the respective ones of said coatings.

4. The device set forth in claim 3, and in which one of said three supporting means is engaged with the periphery of the crystal on the Z′ axis of the latter, and in which the said two supporting means are engaged with the periphery of the crystal at points spaced at angles of approximately 37° from the Z′ axis.

5. A piezoelectric device comprising, in combination, a substantially circular, relatively flat piezoelectric crystal cut to vibrate predominantly in the thickness shear mode and having diametric X and Z′ axes, four mounting means supporting said crystal by engagement with the periphery of the latter, said crystal and mounting means being relatively disposed such that the latter are each displaced by an angle $\alpha$ from the Z′ axis, said angle $\alpha$ corresponding substantially the angle between the Z′ axis and the lines of a dust pattern formed on a crystal of the same size and type and excited at the design temperature of said first-named crystal.

6. A piezoelectric device comprising, in combination, a circular, relatively flat piezoelectric crystal which is cut to vibrate predominantly in the thickness shear mode, electrically conductive coatings on opposite faces of said crystal, four mounting means spaced about the periphery of said crystal for supporting the latter, said crystal and supporting means being constructed and arranged so that the latter engage the crystal substantially on its nodal shear plane, said four mounting means being spaced by equal acute angles $\alpha$ from one principal diametric axis of the crystal, said angle $\alpha$ corresponding to the angle separating the principal diametric axis and the lines of an X-shaped dust pattern formed on a similar crystal when electrically excited, two of said mounting means being electrically conductive, and means for electrically uniting respective ones of said coatings with said last two mounting means.

7. A piezoelectric device comprising, in combination, a circular, relatively flat piezoelectric crystal which is cut to vibrate predominantly in the thickness shear mode, said crystal having a beveled edge terminating in a periphery which lies substantially on the nodal shear plane, conductive coatings on the central areas of the opposite faces of said crystal but free of said beveled edge, four mounting means spaced about and engaging the periphery of said crystal for supporting the latter, said four mounting means being spaced by equal acute angles from one principal diametric axis of the crystal, two of said mounting means being electrically conductive, and means for electrically uniting respective ones of said coatings with said last two mounting means.

8. A piezoelectric device comprising, in combination, a circular AT cut crystal having its peripheral edge beveled to terminate substantially on the nodal shear plane and having diametric Z′ and X axes mutually disposed at right angles, electrically conductive coatings on the central areas of the opposite faces of said crystal, four resilient mounting members spaced apart around the periphery of the crystal and engaged with the edge of the latter at four points each displaced by an angle of approximately 37° from the Z′ axis, and flags extending from said coatings to the edge of the crystal and electrically contacted by two of said mounting members.

9. A piezoelectric device comprising, in combination, a circular, relatively flat piezoelectric crystal cut to vibrate predominantly in the thickness shear mode and having perpendicular X and Z′ diametric axes, said crystal being of the type which when excited at the design frequency with dust thereon produces a dust pattern with five lines terminating at ten points on the crystal periphery, one of said pattern lines lying along the Z′ axis and the other two pairs of pattern lines lying at acute angles relative to the Z′ axis, at least three support members engaging the periphery of the crystal, each of said support members being located to engage one of said ten points.

10. A piezoelectric device comprising, in combination, a circular, relatively flat piezoelectric crystal cut to vibrate predominantly in the thickness shear mode and having perpendicular X and Z′ diametric axes, at least three support members engaged with the periphery of said crystal, at least one of said support members being engaged with the crystal at a peripheral point displaced from the Z′ axis by one of two angles $\alpha_2$ and $\alpha_3$, said angles $\alpha_2$ and $\alpha_3$ being the angles between the Z′ axis and the end points of two pairs of pattern lines formed by dust or the like applied to an excited test crystal similar to the first-named crystal.

11. A piezoelectric device comprising, in combination, a circular, relatively flat piezoelectric crystal cut to vibrate predominantly in the thickness shear mode and having perpendicular X and Z′ diametric axes, at least three support members engaged with the periphery of said crystal to hold the latter, each of said support members being disposed to engage one of ten points spaced about the crystal periphery, said ten points each lying at one of three angles of approximately 0°, 23° and 51° from the Z′ axis.

12. A piezoelectric device comprising, in combination, a circular, relatively flat piezoelectric crystal cut to vibrate predominantly in the thickness shear mode and having perpendicular X and Z′ diametric axes, three support members engaged with the periphery of said crystal to hold the latter, each of said support members being disposed at peripheral points displaced by one of two acute angles $\alpha_2$ and $\alpha_3$ from the Z' axis of the crystal, said angles having values on the order of 23° and 51°, respectively.

References Cited in the file of this patent

UNITED STATES PATENTS

| | | |
|---|---|---|
| 1,969,339 | Ussehman | Aug. 7, 1934 |
| 2,315,392 | Bokovay | Mar. 30, 1943 |
| 2,385,666 | Watrobski | Sept. 25, 1945 |
| 2,392,429 | Sykes | Jan. 8, 1946 |
| 2,484,428 | Smith | Oct. 11, 1947 |
| 2,443,700 | Sylvester et al. | June 22, 1948 |
| 2,470,609 | Elmore et al. | May 17, 1949 |
| 2,967,958 | Kosowsky et al. | Jan. 10, 1961 |

FOREIGN PATENTS

| | | |
|---|---|---|
| 414,764 | Great Britain | Aug. 13, 1934 |
| 985,072 | France | July 13, 1951 |